United States Patent
Zhou et al.

(10) Patent No.: US 11,616,536 B2
(45) Date of Patent: Mar. 28, 2023

(54) TIME DIVISION MULTIPLEXED MULTIPLE DEFAULT BEAMS

(71) Applicant: QUALCOMM Incorporated, San Diego, CA (US)

(72) Inventors: Yan Zhou, San Diego, CA (US); Xiaoxia Zhang, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/860,986

(22) Filed: Apr. 28, 2020

(65) Prior Publication Data

US 2020/0350958 A1 Nov. 5, 2020

Related U.S. Application Data

(60) Provisional application No. 62/843,263, filed on May 3, 2019.

(51) Int. Cl.
*H04B 7/0408* (2017.01)
*H04L 1/18* (2006.01)
(Continued)

(52) U.S. Cl.
CPC .......... *H04B 7/0408* (2013.01); *H04L 1/189* (2013.01); *H04L 1/1864* (2013.01)

(58) Field of Classification Search
CPC .... H04B 7/0408; H04B 7/0695; H04B 7/088; H04W 72/046; H04L 1/18–1896
See application file for complete search history.

(56) References Cited

U.S. PATENT DOCUMENTS 10,873,946 B2 * 12/2020 Seo ................... H04L 5/00
2018/0013481 A1 * 1/2018 Guo ................... H04B 7/086
(Continued)

FOREIGN PATENT DOCUMENTS

EP 3633869 A1 4/2020
WO 2018171044 A1 9/2018
(Continued)

OTHER PUBLICATIONS

Astri et al., "Beam Blockage Detection and Recovery for NR MIMO", 3GPP Draft, R1-1705951, 3GPP TSG RAN WG1 Meeting #88bis, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, Apr. 2, 2017 (Apr. 2, 2017), XP051244060, pp. 1-7, Retrieved from the Internet: URL:http://www.3gpp.org/ftp/Meetings_3GPP_SYNC/RAN1/Docs/ [retrieved on Apr. 2, 2017], Section 2.2, Figures 1, 2.
(Continued)

*Primary Examiner* — Marcus Smith
(74) *Attorney, Agent, or Firm* — Qualcomm Incorporated

(57) ABSTRACT

Aspects of the present disclosure implement techniques for configuring time division multiplexed multiple default beams per slot for communication between the user equipment (UE) and the base station. Thus, in one instance, the time division multiplexed default beams can be applied within each slot (e.g., a plurality of default beams in a single slot) instead of a single default beam. In other instance, the time division multiplexed default beams may be applied across multiple slots (e.g., a first default beam in the first slot and a second default beam in a second slot).

28 Claims, 11 Drawing Sheets

(51) Int. Cl.
     *H04L 1/1867*     (2023.01)
     *H04L 1/1829*     (2023.01)

(56) References Cited

U.S. PATENT DOCUMENTS

| | | | |
|---|---|---|---|
| 2018/0091262 A1 | 3/2018 | Jung et al. | |
| 2018/0375558 A1* | 12/2018 | Takahashi | H04B 7/0695 |
| 2020/0068548 A1* | 2/2020 | Guan | H04B 7/0408 |
| 2020/0163059 A1* | 5/2020 | Zhang | H04W 72/042 |
| 2020/0220582 A1* | 7/2020 | Wu | H04W 72/042 |
| 2020/0260416 A1* | 8/2020 | Kim | H04L 5/0053 |
| 2020/0389847 A1* | 12/2020 | Deng | H04W 52/0219 |
| 2021/0176776 A1* | 6/2021 | Choi | H04W 72/1268 |
| 2021/0378022 A1* | 12/2021 | Ohara | H04W 74/0833 |

FOREIGN PATENT DOCUMENTS

| | | |
|---|---|---|
| WO | 2019013444 A1 | 1/2019 |
| WO | 2019032882 A1 | 2/2019 |

OTHER PUBLICATIONS

International Search Report and Written Opinion—PCT/US2020/030514—ISA/EPO—dated Jul. 21, 2020.

NTT Docomo, Inc: "Further Views on Mechanism to Recover from Beam Failure", 3GPP Draft, R1-1713919_Beam_Recovery, 3GPP TSG RAN WG1 #90, 3rd Generation Partnership Project (3GPP), Mobile Competence Centre, 650, Route Des Lucioles, F-06921, Sophia-Antipolis Cedex, France, vol. RAN WG1, No. Prague, Czechia, Aug. 21, 2017-Aug. 25, 2017, Aug. 20, 2017 (Aug. 20, 2017), XP051316711, 6 Pages, Retrieved from the Internet: URL:http://www.3gpp.org/ftp/Meetings_3GPP_SYNC/RAN1/Docs/ [retrieved on Aug. 20, 2017], Section 4, Figure 3.

\* cited by examiner

TIME DIVISION MULTIPLEXED MULTIPLE DEFAULT BEAMS

CLAIM OF PRIORITY UNDER 35 U.S.C. § 119

The present application for patent claims priority to Provisional Application No. 62/843,263, entitled "TIME DIVISION MULTIPLEXED MULTIPLE DEFAULT BEAMS" filed May 3, 2019, which is assigned to the assignee hereof and hereby expressly incorporated by reference herein for all purposes.

BACKGROUND

Technical Field

The present disclosure relates generally to communication systems, and more particularly, to default beam configuration in a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT), including industrial IoT (IIoT)), and other requirements. 5G NR includes services associated with enhanced mobile broadband (eMBB), massive machine type communications (mMTC), and ultra reliable low latency communications (URLLC). However, there exists a need for further improvements in 5G NR technology.

In 5G, for IoT or IIoT devices, there may a limited time for receiving communications from a base station. As such, a device may not have time to perform an operation for determining a most optimal beam and can instead determine a default beam for receiving communications from the base station.

SUMMARY

Aspects of the present disclosure solve the above-identified problem by implementing techniques for configuring time division multiplexed multiple default beams per slot for communication between the user equipment (UE) and the base station. Thus, in one instance, the time division multiplexed default beams can be applied within each slot (e.g., a plurality of default beams in a single slot) instead of a single default beam. In other instance, the time division multiplexed default beams may be applied across multiple slots (e.g., a first default beam in the first slot and a second default beam in a second slot).

In an aspect, the disclosure provides a method of wireless communication for a user equipment. The method may include determining, at a user equipment (UE), that a downlink communication is unsuccessful during an initial transmission period; activating a multiple default beam configuration for receiving the downlink communication during a retransmission period; and configuring the UE to receive the downlink communication over a plurality of default beams associated with the multiple default beam configuration during the retransmission period.

In another aspect, the disclosure provides an example apparatus for wireless communication. The apparatus may include a memory storing computer-executable instructions and at least one processor coupled with the memory. The at least one processor may be configured to determine, at a UE, that a downlink communication is unsuccessful during an initial transmission period; activate the multiple default beam configuration for receiving the downlink communication during a retransmission period; and configure the UE to receive the downlink communication over a plurality of default beams associated with the multiple default beam configuration during the retransmission period.

In another aspect, the disclosure provides an example apparatus for wireless communication. The example apparatus may include means for determining, at a UE, that a downlink communication is unsuccessful during an initial transmission period; activating the multiple default beam configuration for receiving the downlink communication during a retransmission period; and configuring the UE to receive the downlink communication over a plurality of default beams associated with the multiple default beam configuration during the retransmission period.

In another aspect, the disclosure provides a non-transitory computer-readable medium storing computer executable code. The code when executed by a processor may cause the processor for determining, at a UE, that a downlink communication is unsuccessful during an initial transmission period; activating the multiple default beam configuration for receiving the downlink communication during a retransmission period; and configuring the UE to receive the downlink communication over a plurality of default beams associated with the multiple default beam configuration during the retransmission period.

In an aspect, the disclose provides a method of wireless communication including activating, by a UE, a multiple default beam configuration for receiving a downlink communication, and configuring, by the UE, a plurality of default beams over which to receive, in a period comprising a plurality of slots, the downlink communication, wherein the plurality of default beams are associated with the multiple default beam configuration.

In another aspect, the disclosure provides a UE for wireless communication including a memory storing computer-executable instructions, and at least one processor coupled with the memory and configured to activate a multiple default beam configuration for receiving a downlink communication during a retransmission period, and configure a plurality of default beams over which to receive, in a period comprising a plurality of slots, the downlink communication, wherein the plurality of default beams are associated with the multiple default beam configuration during the retransmission period.

In an aspect, the disclose provides a method of wireless communication including activating, by a base station, a multiple default beam configuration for a UE to receive a downlink communication transmitted by the base station, and transmitting, by a base station and in a period comprising a plurality of slots, the downlink communication over a plurality of default beams associated with the multiple default beam configuration.

In another aspect, the disclosure provides a base station for wireless communication including a memory storing computer-executable instructions, and at least one processor coupled with the memory and configured to activate a multiple default beam configuration for the UE to receive a downlink communication transmitted by the apparatus, and transmit, in a period comprising a plurality of slots, the downlink communication over a plurality of default beams associated with the multiple default beam configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

DETAILED DESCRIPTION

Figure 1:
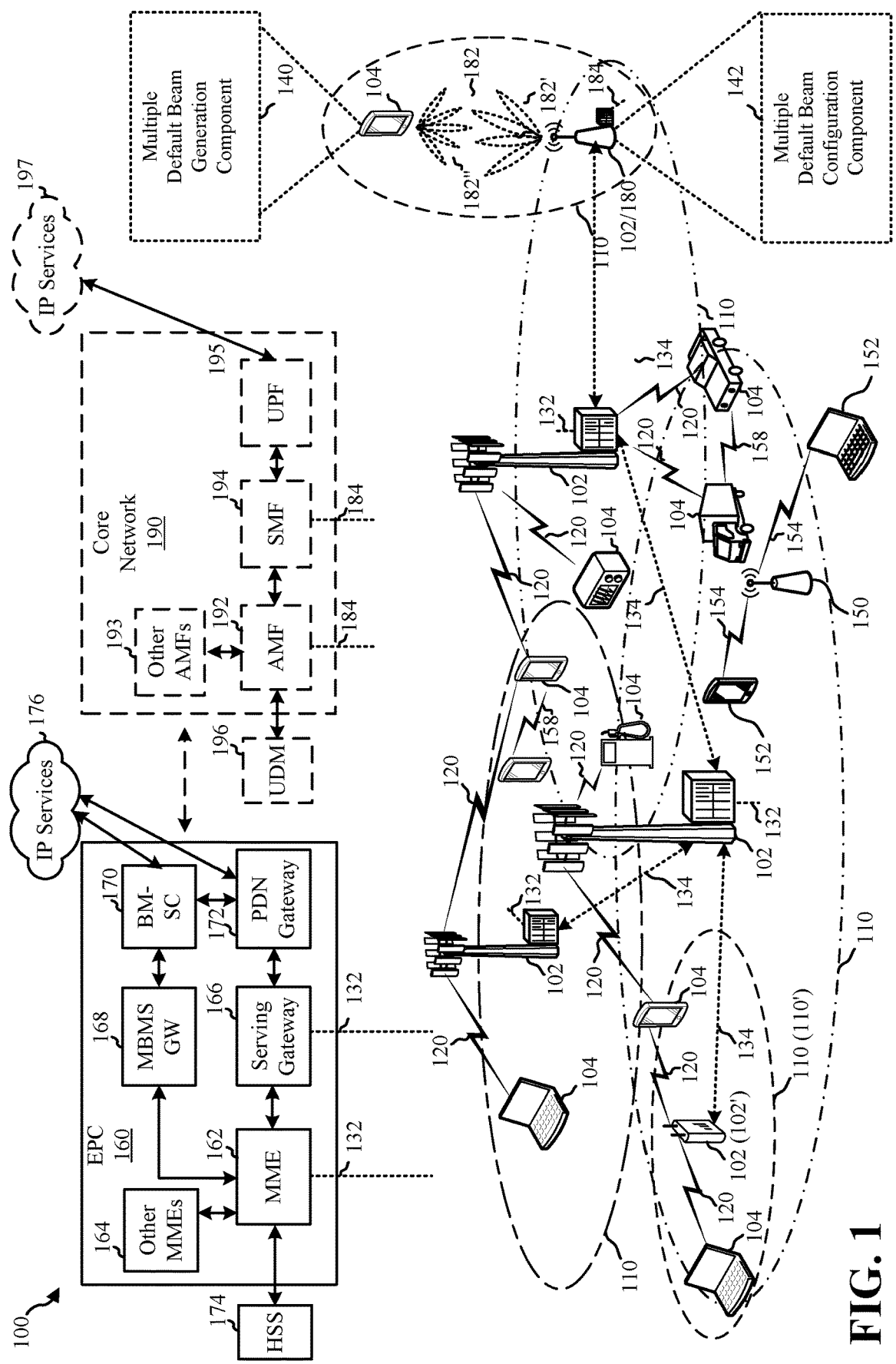
FIG. 1 is a diagram illustrating an example of a wireless communications system according to an implementation of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some wireless communication technologies, such as fifth generation (5G) new radio (NR), devices can be configured as Internet-of-things (IoT) or industrial IoT (IIoT) devices, which can have a user equipment (UE) functionality (and are referred to herein more generally as UEs). In some aspects, a semi-persistent scheduling (SPS) for the scheduling of a periodic communication (e.g., an uplink communication or a downlink communication) can be provided to such devices. For instance, a base station may provide configuration information identifying an SPS configuration, and the device may transmit or receive a communication in accordance with the SPS configuration. In 5G NR, for example, communications can occur based on a time and frequency resources that may include an orthogonal frequency division multiplexing (OFDM) symbol, a single carrier frequency division multiplexing (SC-FDM) symbol, or other symbol, a collection of multiple symbols in a slot, etc. In IoT/IIoT with 1 millisecond (ms) traffic periodicity, there may only be 8 slots available for both an initial transmission and a retransmission if the initial transmission is unsuccessful (e.g., due to beam blockage or other potential issues). As such, in some aspects, there is a limited time to perform the transmission and/or possible retransmission and the device may not have time for performing procedures for determining an optimal beam. Thus, the device may determine a default beam for an SPS communication, such as a default beam for a physical downlink shared channel (PDSCH). In one example, the device may determine the default beam based at least in part on a control resource set (CORESET) and/or a search space (SS) or search space set of the SPS.

In some instances, the default beam may follow quasi-colocation (QCL) indication of lowest CORESET identification (ID) in a latest monitored slot. A single default beam, however, may not provide sufficient diversity due to blockage and interference. Thus, lack of beam diversity may adversely impact the reception of the device.

In other instances, a single downlink control information (DCI) may be scheduled for both slot-based and mini-slot based PDSCH repetition with same or different transmission configuration indication (TCI) states. In such instances, however, the scheduling offset (e.g., $k_0$) may be greater than zero (0) in order to allow the device to decode the indicated TCI states. Such delay may add unnecessary latency.

As one example, for a UE, multiple TCI states can be configured for a quasi-colocation (QCL) indication (e.g., including a spatial QCL parameter for beam indication). The UE may determine a beam for a transmission based at least in part on the indicated TCI state. For example, if a scheduling offset of the transmission fails to satisfy a threshold, the UE may use a beam based at least in part on a default TCI state, which may be used for physical downlink control channel (PDCCH) QCL indication of a lowest CORESET identifier in the latest slot in which one or more CORESETs are configured for the UE. For example, if the scheduling offset satisfies the threshold, the UE may use a beam indicated by the TCI field in the assignment DCI. For some PDSCH transmissions that are not associated with a scheduling PDCCH, such as SPS communications, however, the default beam from the most recent CORESET may be too outdated, e.g., when the search space monitoring periodicity is large. On the other hand, configuring many search spaces with small periodicity for the purpose of default beam indication may introduce increased overhead. To rectify this issue, in one example, a virtual search space or CORESET may be configured. The virtual search space or CORESET may be a type of search space or CORESET that is defined only for PDSCH QCL indication. For example, the virtual search space or CORESET may not include a PDCCH, and the UE may not perform blind decoding for the virtual search space or CORESET. When the UE uses the virtual search space or CORESET, however, the UE may incur significant latency if a default beam is to be configured or reconfigured during operation, as the radio resource control (RRC) information used to configure the virtual search space or CORESET may be associated with significant overhead.

Aspects of the present disclosure solve the above-identified problem by implementing techniques for configuring multiple default beams per slot for communication between the user equipment (UE) and the base station. Thus, in one instance, the time division multiplexed default beams can be applied within each slot (e.g., a plurality of default beams in a single slot) instead of a single default beam. In other instance, the time division multiplexed default beams may be applied across multiple slots (e.g., a first default beam in the first slot and a second default beam in a second slot, etc.). In either case, for example, the multiple default beams can be provided for at least one of initial transmissions or retransmissions.

In some aspects, the multiple default beam configuration may be determined by either explicit signaling or by implicit rule. For example, the explicit signaling may include RRC/media access control (MAC) control element (CE), downlink control information (DCI), and/or the like for reconfiguring the default beam pattern.

In other examples, implicit rule may be determined based on other beam related configuration (e.g., CORESET beam configuration). In some aspects, this may be performed on a per slot basis to determine the in-slot default beam pattern. In some examples, a slot can be divided into multiple mini-slots of one or multiple symbols, and the concepts described herein can be similarly applied to slots or mini-slots. For example, for each slot, a slot with an odd number index (e.g., where the index indicates the position in time of the slot within a frame or other larger time division) may use Rx beam of a lowest CORSEST ID in a latest monitored slot, and/or a slot with an even number index may use Rx beam of the lowest CORSEST ID in a second latest monitored slot, and/or vice versa. In other examples, in each slot, a slot with an odd/number index may use Rx beam of lowest CORESET ID in a latest monitored slot, and/or a slot with an even number index may use Rx beam of a second lowest CORSEST ID in the latest monitored slot, and/or vice versa. In some aspects, the odd/even number of the slots may be determined based on counting the slots in sequence within a frame (or counting mini-slots in sequence within a slot and regardless of mini-slot duration, which may be different) or based on odd/even starting OFDM symbol of each slot/mini-slot. For cross-slot time division multiplexed default beam pattern, odd/even slots may use Rx beam of lowest CORESET ID in latest monitored slot, respectively.

Additionally or alternatively, the multiple default beam configuration may be configured either selectively or on an on-demand basis. With respect to the selective configuration, the multiple default beams may be selectively applied to certain slots to use secondary beams only when necessary as the secondary beams may have lower signal-to-noise ratio (SNR) and may use additional total radiated power (TRP). To further reduce the use of secondary beams, the multiple default beams may be activated on-demand over certain slots. However, if not activated, the original default beam may be applied to the slots.

With respect to on-demand configuration, the multiple default beams may be activated when initial downlink signal during the initial transmission fails. In some examples, the activation condition for the UE may be activated when the UE transmits a negative acknowledgement (NACK) in response to the initial downlink transmission. In another example, the activation condition for the base station may be activated when the base station receives the NACK from the UE or the corresponding uplink signal is not successfully decoded for the initial downlink transmission.

In some instances, misaligned activation may be triggered when the UE sends an acknowledgement (ACK) signal in response to the initial downlink signal from the base station, but the ACK signal is not received (not successfully decoded) by the base station. In such instance, while the UE may not activate the multiple default beam configuration, the base station may assume failure of initial signal and thus activate multiple default beam configuration for the retransmission period. However, the misalignment may not affect the uplink retransmission because the UE may still monitor original SS/PDCCH, which schedules the uplink retransmissions.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and optionally another core network 190 (e.g., a 5G Core (5GC)). A UE 104 can include a multiple default beam generating component 140 for activating a multiple default beam configuration for receiving downlink communications. A base station 102 can include a multiple default beam configuration component 142 for configuring one or more parameters related to the UE 104 activating the multiple default beam configuration. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with core network 190 and/or EPC 160 through backhaul links 132, 134, 184, which may be wired or wireless. In an aspect, for example, an EN-DC configuration may utilize an LTE master cell group (MCG) and EPC 160 to support communications between the UE 104 and base stations 102 configured for 5G NR. The base stations 102 configured for 5G NR may establish a backhaul link (e.g., S1 bearer) directly with the serving gateway 166 of the EPC or via a master eNB (i.e., a base station 102 configured for 4G LTE). Accordingly, a UE 104 may establish a 5G NR connection with a 5G access network even if a 5GC is not deployed. Although the following description may be focused on 5G NR and LTE, the concepts described herein may be applicable to other similar areas, such as, LTE-A, CDMA, GSM, and other wireless technologies.

In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point, or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.), or IIoT devices having UE functions and used in an industrial setting. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2A:
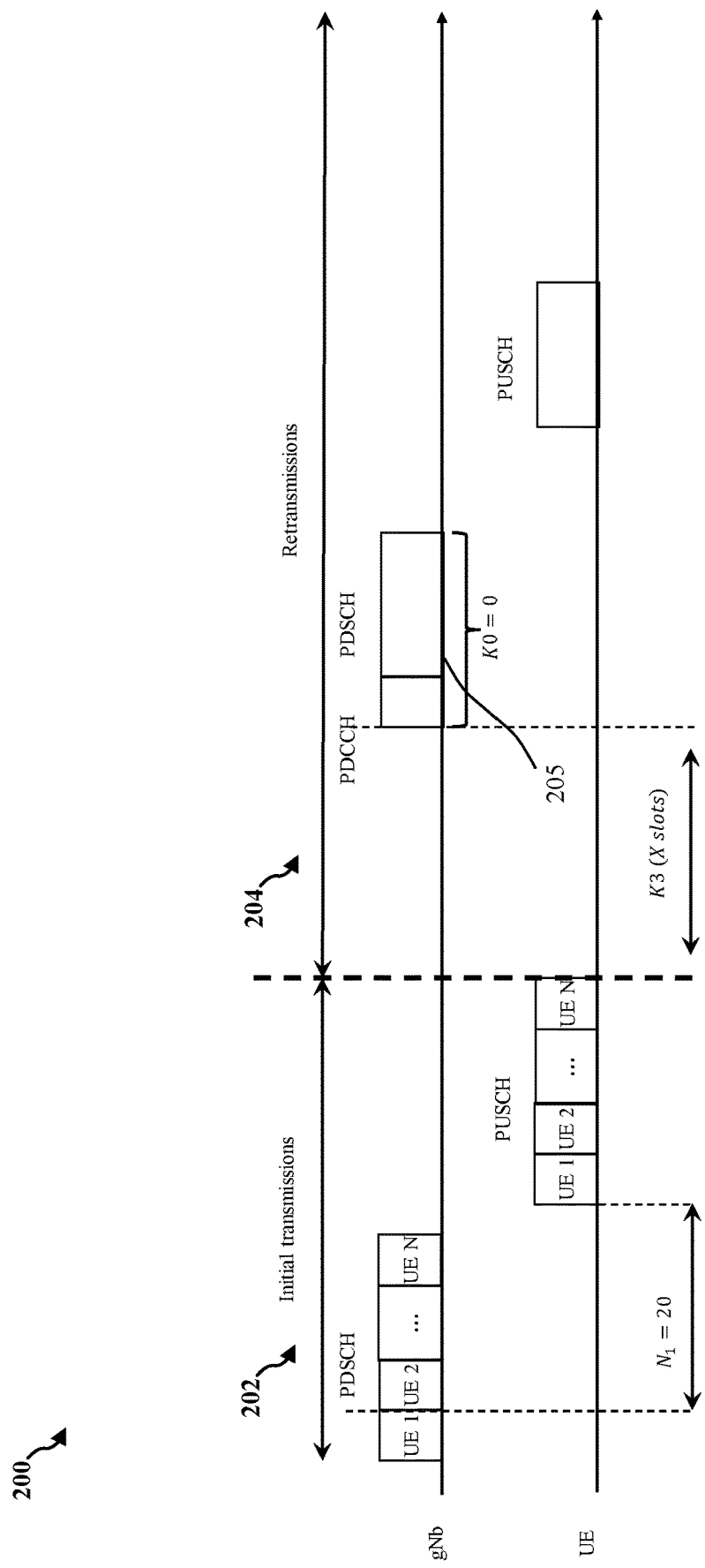
FIGS. 2A and 2B are example timing diagrams of solutions relying on a single default beam solution.
Figure 2B:
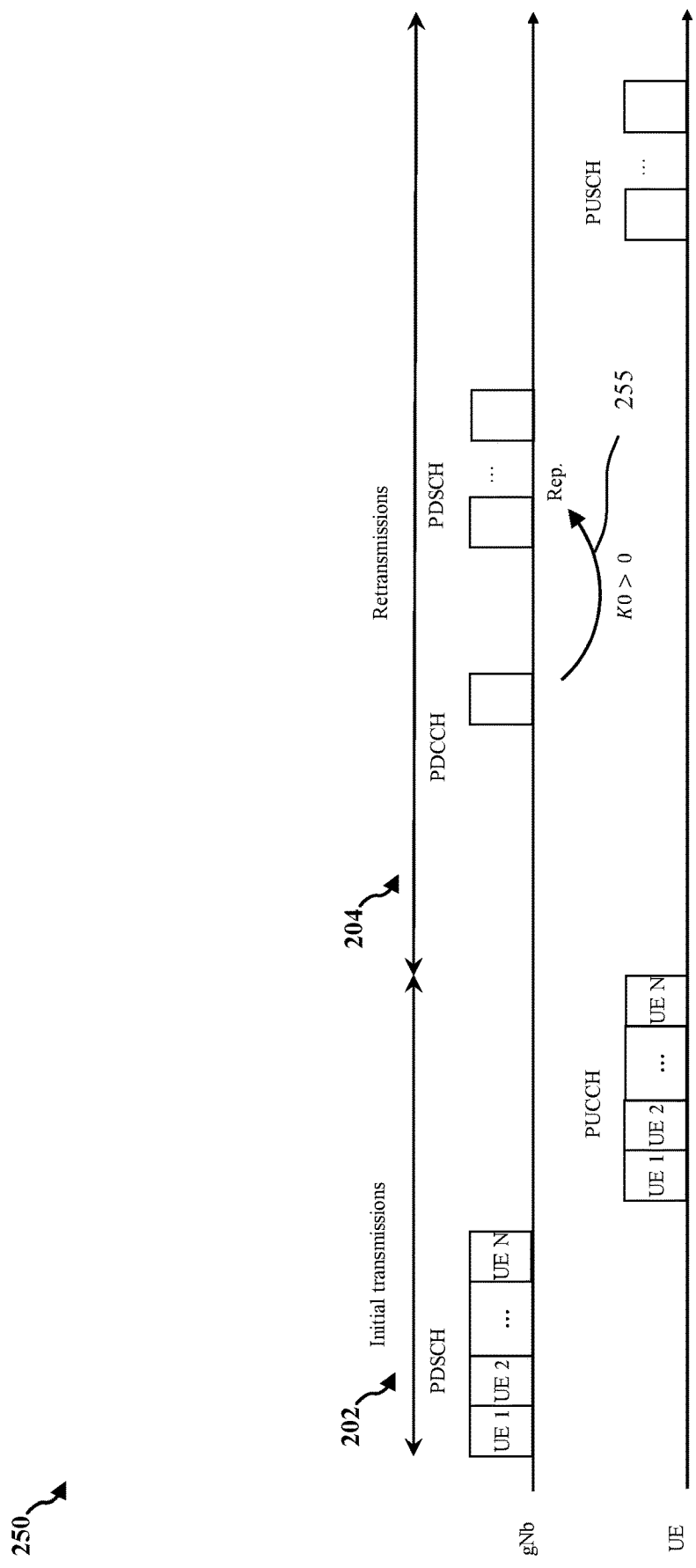

FIGS. 2A and 2B are examples of timing diagrams 200, 250 of using a single default beam. As discussed above, a SPS may provide for the scheduling of a periodic communication for a UE. For example, a base station may provide configuration information identifying an SPS configuration, and the UE may transmit or receive a communication in accordance with the SPS configuration. In 5G NR, for IoT/IIoT devices using 1 ms traffic periodicity, there may only be 8 slots available for both initial transmission and retransmission if an initial transmission is unsuccessful (e.g., due to beam blockage or other possible conditions).

For example, an initial transmission period 202 can include a first number of slots (e.g., less than eight) and a retransmission period 204 can include a second number of slots that can be determined as the first number of slots, n, of the initial transmission period 202 subtracted from the total number of slots (e.g., retransmission period can be 8-n slots in duration). In an example, the initial transmission period can be configured by a base station (e.g., or by a network via the base station) and can be based on a traffic period or cycle time of a corresponding UE or related device, as defined in third generation partnership project (3GPP) technical specification (TS) 22.804. In an specific example, where the UE corresponds to a printing machine, the cycle time can be configured as less than 2 milliseconds, and the base station can configure the initial transmission period as a number of slots to correspond with this cycle time. The base station can indicate the initial transmission period to the UE, and the UE can determine the initial transmission period and the retransmission period based on a total number of slots.

In some aspects, a UE may determine a default beam for an SPS communication such as a default beam for a physical downlink shared channel (PDSCH) of the SPS. The UE may determine the default beam based at least in part on a CORESET and/or a search space (SS) or search space set of the SPS.

In some instances, as illustrated in FIG. 2A, the default beam for retransmission of PDSCH 205 may follow QCL indication of lowest CORESET-ID in the latest monitored slot. However, a single default beam may not provide sufficient diversity due to blockage and interference. Thus, lack of beam diversity may adversely impact signal reception capabilities of the UE. In other instances, as illustrated in FIG. 2B, a single DCI may be scheduled for both slot-based and mini-slot based PDSCH repetition with same or different transmission configuration indication (TCI) states. However, in such instance, the scheduling offset (e.g., $k_0$) 255 may need to be greater than zero (0) in order to allow the UE to decode the indicated TCI states and determine a beam for receiving the PDSCH. Such delay may add unnecessary latency for the UE and introduce inefficiencies for communication.

Aspects of the present disclosure solve at least the above-identified problems by providing techniques for configuring multiple default beams per slot for communication between the UE and the base station. Thus, in one instance, the default beams can be applied within each slot (e.g., a plurality of default beams in a single slot) instead of a single default beam. In other instance, the multiple default beams may be applied across multiple slots (e.g., a first default beam in the first slot and a second default beam in a second slot, etc.). In either example, the multiple default beams can be applied for at least the retransmission period and/or for the initial transmission period. This can provide additional diversity for receiving the communications based on multiple different beams, which can improve likelihood of the UE receiving the communications from the base station based on one of the multiple beams.

Figure 3:
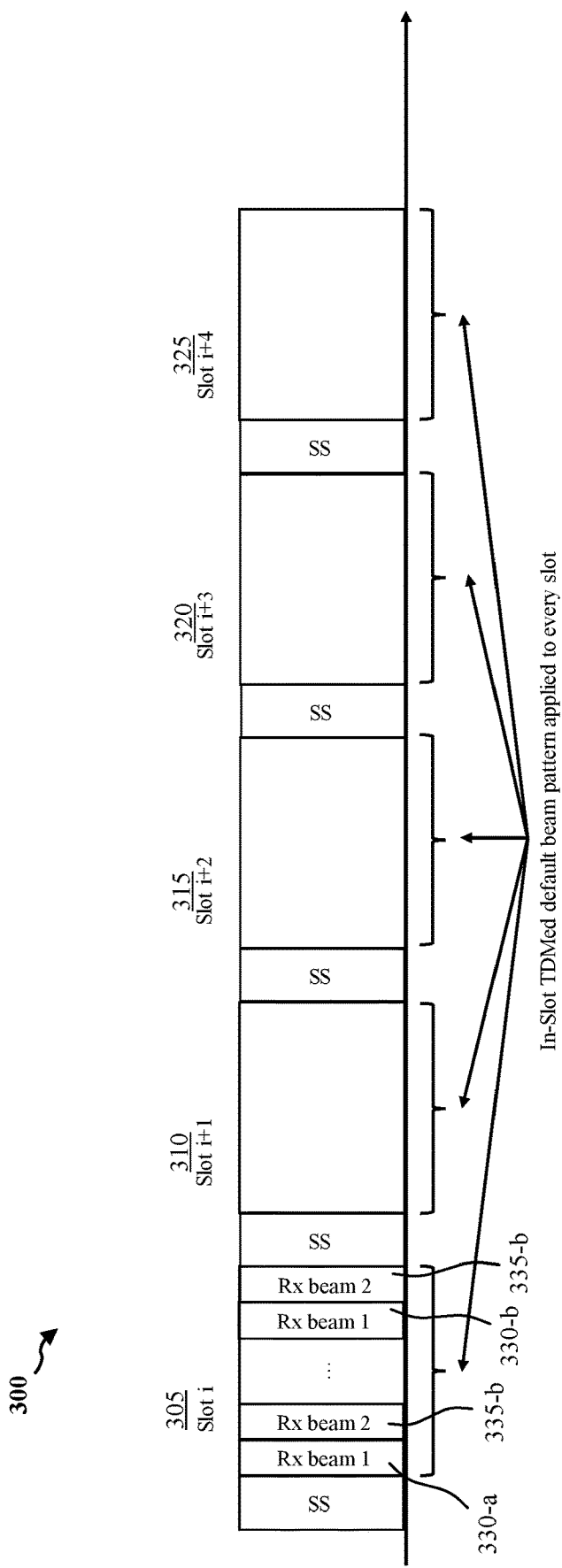
FIG. 3 is a timing diagram of an example TDMed multiple default beam pattern that incorporated in-slot in accordance with aspects of the present disclosure.

FIG. 3 is a timing diagram 300 of an example of a multiple default beam pattern that is incorporated within one or more slots (e.g., 305, 310, 315, 320, 325) using time division multiplexing (TDM) in accordance with aspects of the present disclosure. In such configuration, with respect to scheduling of a periodic communication (e.g., an uplink communication or a downlink communication) for a UE, one or more slots (305, 310, 315, 320, and/or 325) may be configured with multiple default beams that are time division multiplexed (TDMed). In an example, the one or more slots (305, 310, 315, 320, and/or 325) may be slots during a retransmission period (e.g., if the initial downlink communication is unsuccessful during the initial transmission period). In another example, the one or more slots (305, 310, 315, 320, and/or 325) may include slots in the initial transmission period).

For example, within the first slot 305, a first default beam 330-*a* ("Rx beam 1") and the second default beam 330-*b* ("Rx beam 2") may be interleaved, in time, within the slot. Although the illustrated example shows only two default beams, any number of a plurality of default beams may be used. In addition, each beam may be applied to a portion of the slot, such as to one symbol such that each alternating symbol uses Rx beam 1 or Rx beam 2. In another example, each beam may be applied to multiple adjacent symbols within the slot, and in an alternating pattern. Thus, for example, a first collection of one or more symbols within the slot may use Rx beam 1, a second collection of one or more symbols within the slot (which may be the same or different number as the first collection may use Rx beam 2, etc. In any case, in this example, instead of a single default beam, the TDMed multiple default beams can be applied within each slot. The specific beam pattern within each beam may be either the same for all slots or a subset of slots or different for a given slot and/or subsets of slots. In addition, the specific beam pattern may be determined by explicit signaling or implicit rule. In some aspects, the set of slots may be only subset of all available slots per cycle as to minimize the TRP (e.g., additional resources) that is used to support the secondary beam.

Figure 4:
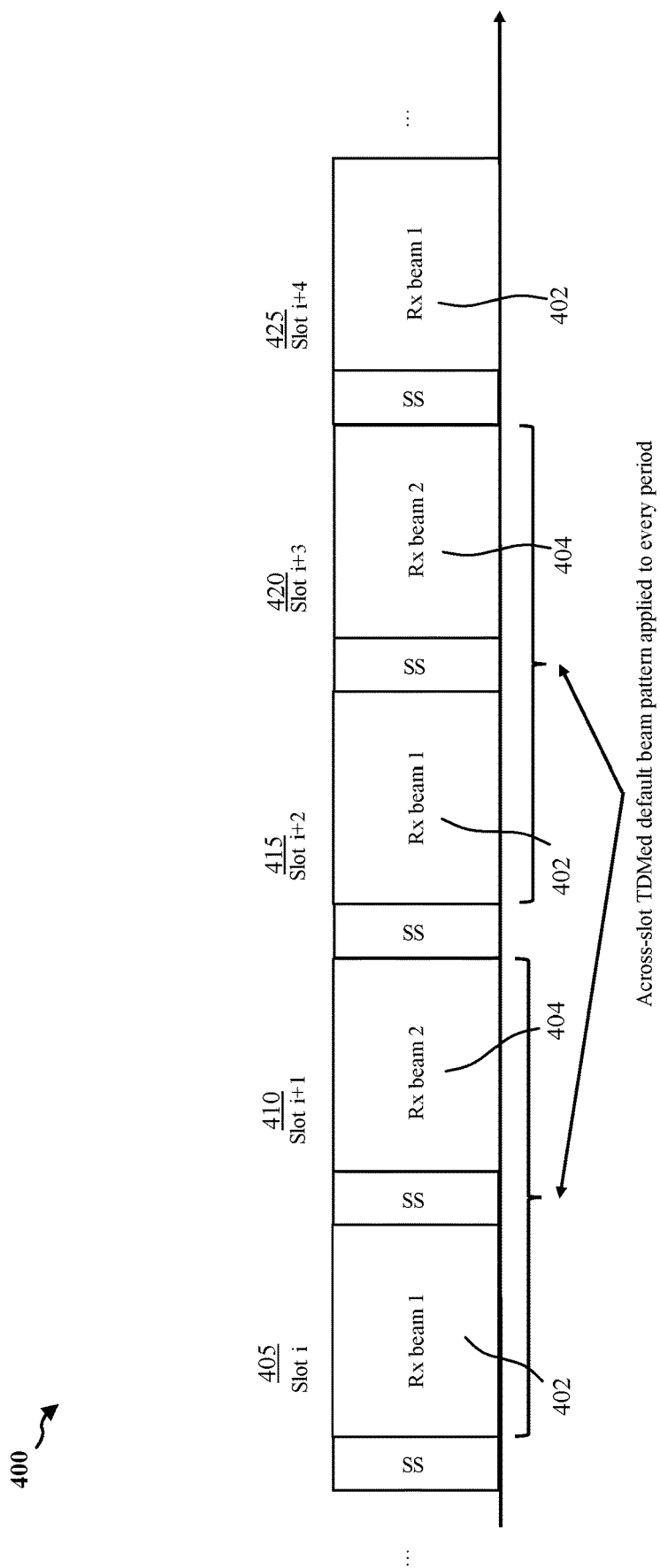
FIG. 4 is a timing diagram of an example TDMed multiple default beam pattern that is spread across plurality of slots.

FIG. 4 is a timing diagram 400 of an example of TDMed multiple default beam pattern that is spread across a plurality of slots. In this example, each slot (e.g., first slot 405, second slot 410, etc.) may include a different alternating default beam. However, for each slot itself (e.g., first slot 405), a single default beam can occupy the entire slot. Thus, as one example, for the first slot 405, a first default beam 402 ("Rx beam 1") may be used to receive the downlink information from the base station, and during the second slot 410, a second default beam 404 ("Rx beam 2") may be used to receive the downlink information from the base station. The pattern may be repeated or adjusted for the subsequent slots (415, 420, and 425). As shown, for example, slot 415 can use Rx beam 1 402, slot 420 can use Rx beam 2 404, slot 425 can use Rx beam 1 402, etc. In an example, the one or more slots (405, 410, 415, 420, and/or 425) may be slots during a retransmission period (e.g., if the initial downlink communication is unsuccessful during the initial transmission period). In another example, the one or more slots (405, 410, 415, 420, and/or 425) may include slots in the initial transmission period).

Figure 5:
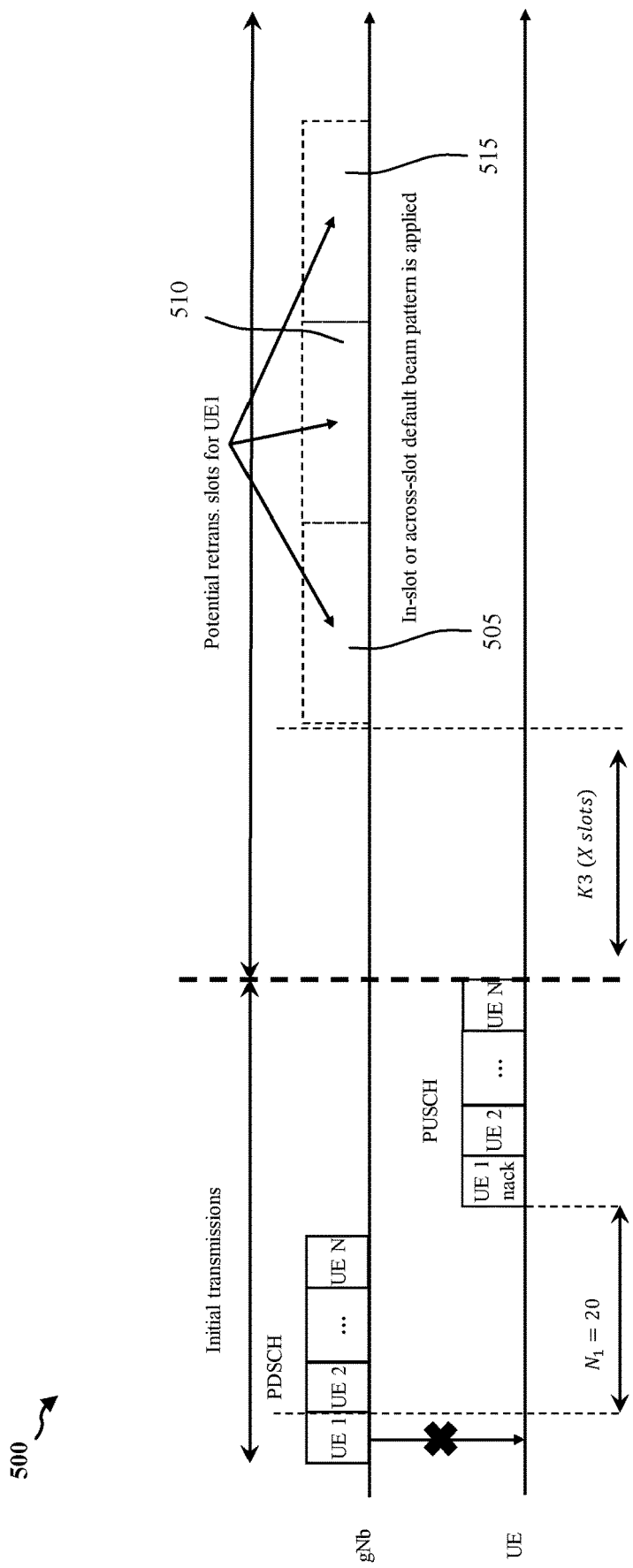
FIG. 5 is a timing diagram that illustrates an example of the selective configuration of TDMed multiple default beams that are activated when initial downlink fails.

FIG. 5. is a timing diagram 500 that illustrates an example of selective configuration of TDMed multiple default beams that can be activated when initial downlink transmission from the base station fails (e.g., due to blockage, inability to be decoded, or other conditions). As noted, the TDMed multiple default beam configuration may be configured either selectively or on an on-demand basis. With respect to the selective configuration, the TDMed multiple default beam may be selectively applied to potential slots (e.g., retransmission first slot 505, retransmission second slot 510, retransmission third slot 515) during the retransmission period to use secondary beams for transmitting the retransmission. Selectively applying the configuration may be beneficial as the secondary beams may have lower SNR and may use additional total radiated power (TRP). Thus, in some examples, the TDMed multiple default beam configuration may be activated, for instance, for the first slot 505 and the third slot 515, but omitted for the second slot 510. Each slot may also be adaptively configured for either in-slot default beam pattern (e.g., plurality of default beams activated or transmitted in single slot, as described in the example of FIG. 3 above) or across-slot default beam pattern (e.g., first default beam in the first activated or transmitted slot, and second default beam in the second activated or transmitted slot, etc., as described in the example of FIG. 4 above).

Figure 6:
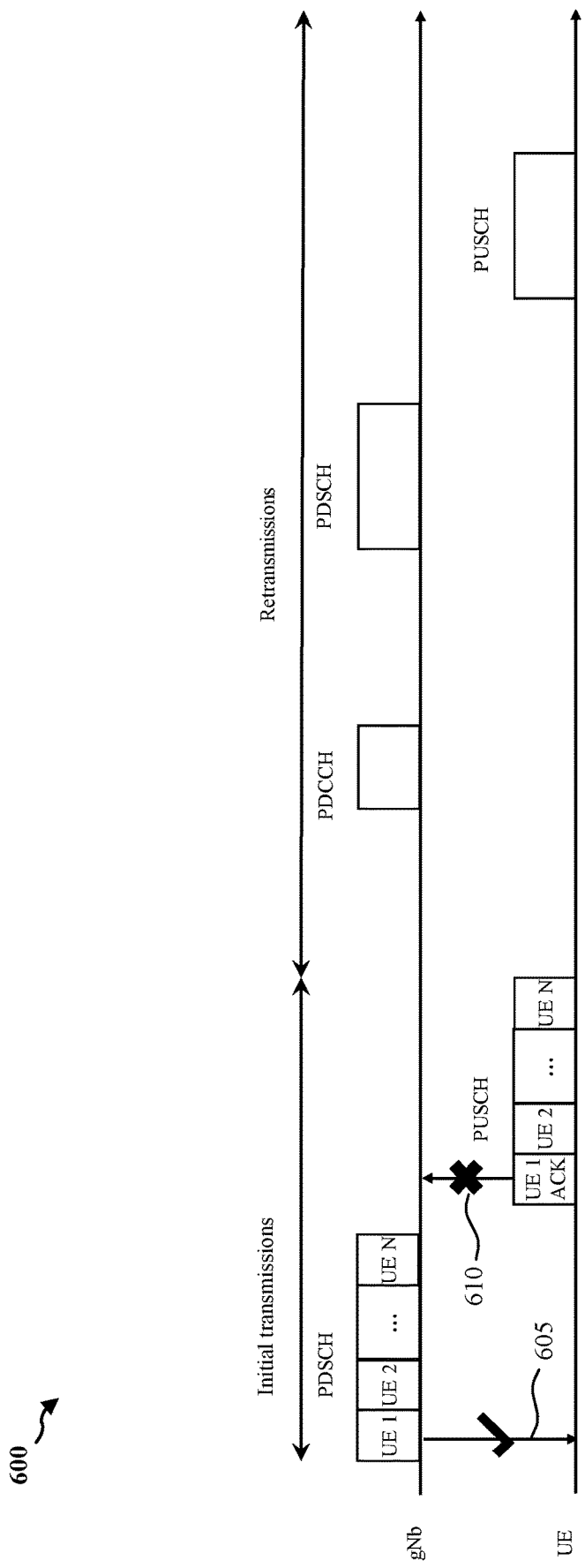
FIG. 6 is a timing diagram that illustrates an example on-demand configuration for TDMed multiple default beams associated with misaligned activation between the UE and base station.

FIG. 6 is a timing diagram 600 that illustrates an example of an on-demand configuration for TDMed multiple default beams associated with misaligned activation between the UE and base station.

As discussed above, with respect to on-demand configuration, the TDMed multiple default beam may be activated when an initial downlink signal during the initial transmission period fails. In some examples, the activation condition for the UE may be activated when the UE transmits a NACK in response to the initial downlink transmission. In another example, the activation condition for the base station may be activated when the base station receives the NACK from the UE or the corresponding uplink signal is not decoded for the initial downlink transmission.

However, in some instances—as illustrated in FIG. 6—misaligned activation of TDMed multiple default beam configuration may be triggered when the UE sends an ACK signal in response to the initial downlink signal 605 that is successfully received from the base station, but the ACK signal is not received (or unable to be decoded) 610 by the base station. In such instance, while the UE may not activate the TDMed multiple default beam configuration for the retransmission period, the base station may assume that there was a failure of initial downlink transmission, and thus may activate TDMed multiple default beam configuration for retransmission period. However, the misalignment may not affect the uplink retransmission because the UE can still monitor the original SS/PDCCH, which schedules the uplink retransmissions.

In another instance, the on-demand configuration can be activated for one collection of slots where the UE transmits NACK, and/or the base station receives the NACK, in a previous collection of slots. In this example, the on-demand configuration can be activated for at least the retransmission period in the one collection of slots and/or for the initial transmission period in the one collection of slots.

Figure 7:
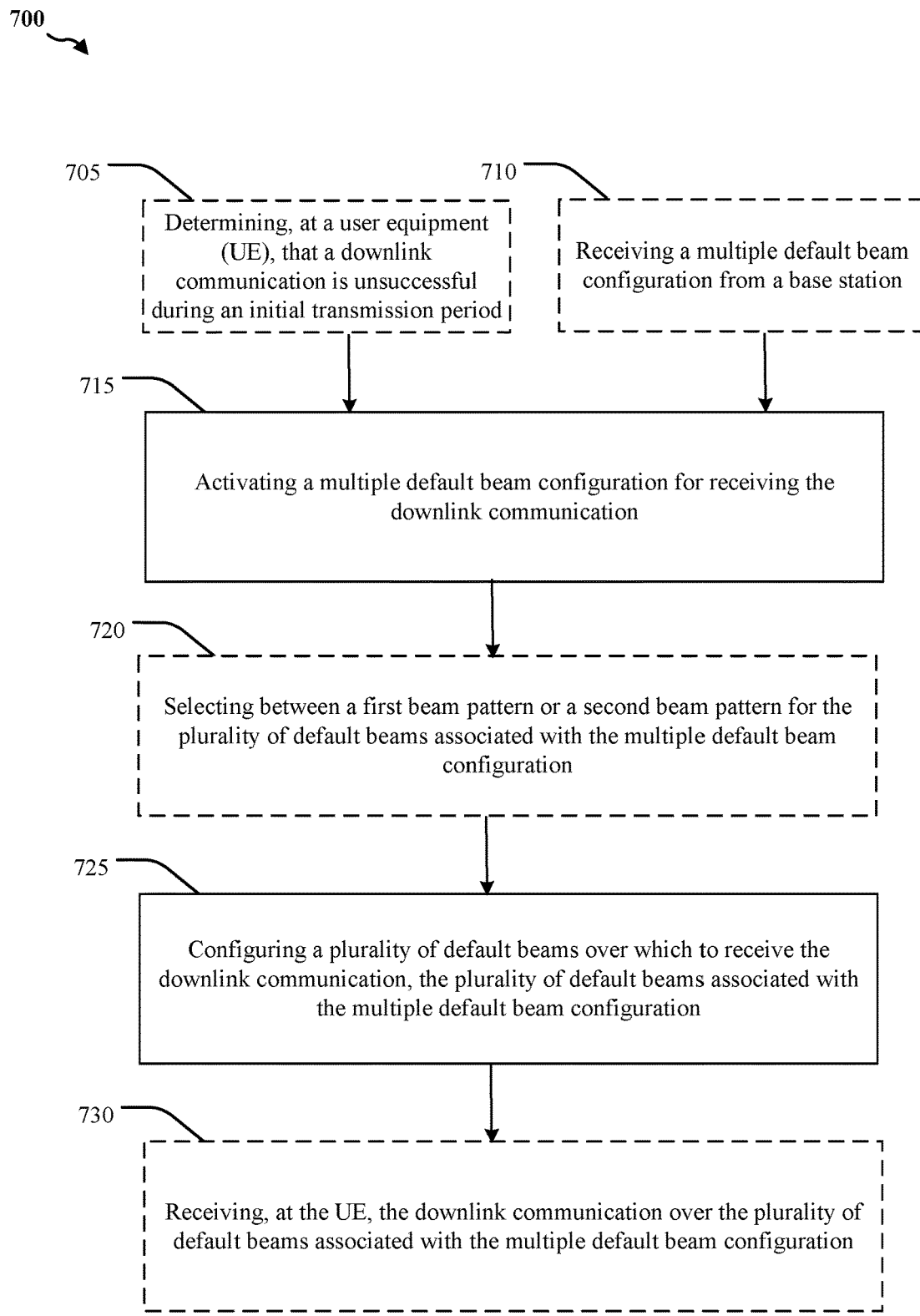
FIG. 7 is a flowchart of an example method of wireless communications performed by the UE.

FIG. 7 is a flowchart of an example of a method 700 of wireless communications. The method 700 may be performed by the user equipment (UE) and/or components thereof.

At block 705, the method 700 may optionally include determining, at a UE, that a downlink communication is unsuccessful during an initial transmission period. In some examples, determining that the downlink communication is unsuccessful during an initial transmission period may comprise determining that the downlink communication is either not received or the UE is unable to decode the downlink communication. For example, the downlink communication may relate to downlink communications over SPS resources. In any case, where the downlink communication is unsuccessful, the UE may generate a NACK message to transmit to the base station in response to determining that the downlink communication was unsuccessful, and the UE may transmit the NACK to the base station. In some aspects, as discussed herein, based on transmitting the NACK to the base station, the UE may activate the multiple default beam configuration on-demand (e.g., the TDMed multiple default beam configuration). When the NACK is received by the base station, the multiple default beam configuration may correspondingly be activated at the base station on-demand. Aspects of block 705 may be performed by the transceiver 802 and the multiple default beam generation component 840 discussed with reference to FIG. 8.

At block 710, the method 700 may optionally include receiving a multiple default beam configuration from a base station. In some examples, the UE can receive a multiple default beam configuration in explicit signaling from a base station (e.g., in RRC, MAC-CE, DCI, etc. as an initial configuration, a reconfiguration of an initial configuration, etc., as described). In other examples, the UE can determine the multiple default beam configuration based on receiving other configurations from the base station (e.g., a CORESET configuration). In other examples, the UE can determine the multiple default beam configuration as stored in a memory (e.g., memory 816 discussed with reference to FIG. 8).

At block 715, the method 700 may include activating a multiple default beam configuration for receiving the downlink communication. For example, activating the multiple default beam configuration may include the UE determining one of multiple default beams for receiving downlink communications from the base station, which may occur on-demand or otherwise without regard to the initial transmission period and/or transmitting feedback. Indeed, in some examples, the UE can activate the multiple default beam configuration for the downlink communications in the initial transmission period as well as the retransmission period. In other examples, however, the UE may activate the multiple default beam configuration for the downlink communications only in the retransmission period (or only in the initial transmission period), etc. As described, activating the multiple default beam configuration may include determining a receive beam pattern for receiving downlink communications within a slot (e.g., determining a first receive beam for receiving downlink communications in a first portion of a slot, a second receive beam for receiving downlink communications in a second portion of the slot, the first receive beam (or a third receive beam) for receiving in a third portion of the slot, etc.).

In another example, activating the multiple default beam configuration may include the UE determining a receive beam pattern for each of multiple slots for receiving downlink communications across the slots (e.g., determining a first receive beam for receiving downlink communications in a first slot, a second receive beam for receiving downlink communications in a second slot, the first receive beam (or a third receive beam) for receiving in a third slot, etc.). Aspects of block 715 may be performed by the multiple default beam generation component 840 discussed with reference to FIG. 8.

At block 720, the method 700 may optionally include selecting between a first beam pattern or a second beam pattern for the plurality of default beams associated with the multiple default beam configuration. In some examples, the first beam pattern may include both a first default beam and a second default beam (and/or additional default beams) included in a first slot (e.g., during the initial transmission period or the retransmission period), and the second beam pattern may include a first default beam in a first slot and a second default beam in a second slot (e.g., during the initial transmission period or the retransmission period), and/or additional default beams in additional subsequent slots, where the pattern may repeat across slots, etc., as described. In an example, selecting between the first beam pattern or the second beam pattern may be determined by explicit signaling or implicit rule. For example, the UE may receive an explicit signaling from the base station (e.g., via RRC, MAC CE, DCI, and/or the like, as described at Block 710). In another example, the UE may determine the implicit rule based on CORESET beam configuration (e.g., the beam pattern can be determined based on a known association with the CORESET, as described). Aspects of block 720 may be performed by the multiple default beam generation component 840 discussed with reference to FIG. 8.

At block 725, the method 700 may include configuring a plurality of default beams over which to receive the downlink communication, the plurality of default beams associated with the multiple default beam configuration. As discussed above, once the multiple default beam configuration is selected, the UE may further determine the beam pattern (e.g., first beam pattern or second beam pattern) to implement for reception of the downlink communication in at least one of the retransmission period and/or the initial transmission period (and/or for a selection of slots in the retransmission period and/or the initial transmission period). To this end, in one example, configuring the UE may include configuring the plurality of default beams within each slot of a plurality of slots (e.g., first beam pattern). In another example, configuring the UE may include configuring a first default beam of the plurality of default beams for a first slot to receive the downlink communication, and configuring a second default beam of the plurality of default beams for a second slot to receive the downlink communication (e.g., second beam pattern). Aspects of block 725 may be performed by the multiple default beam generation component 840 discussed with reference to FIG. 8.

At block 730, the method 700 may optionally include receiving, at the UE, the downlink communication over the plurality of default beams associated with the multiple default beam configuration. As discussed above, the base station can transmit the initial transmission, which the UE can attempt to receive, and/or can transmit one or more retransmissions of the initial transmission (e.g., based on receiving NACK or no feedback from the UE). In this example, the UE can attempt to receive at least the retransmission of the initial transmission in one or more retransmission slots based on the configured beam pattern. In other examples, the UE can attempt to receive the initial transmission based on the configured beam pattern as well. In either case, for example, the UE can beamform antenna resources to generate the appropriate beam for receiving the communications from the base station based on the first beam pattern or the second beam pattern. In an example, the retransmission can correspond to PDSCH signaling, as described above. This can improve likelihood of receiving the PDSCH signaling from the base station, as described above. Aspects of block 725 may be performed by the multiple default beam generation component 840 discussed with reference to FIG. 8.

Figure 8:
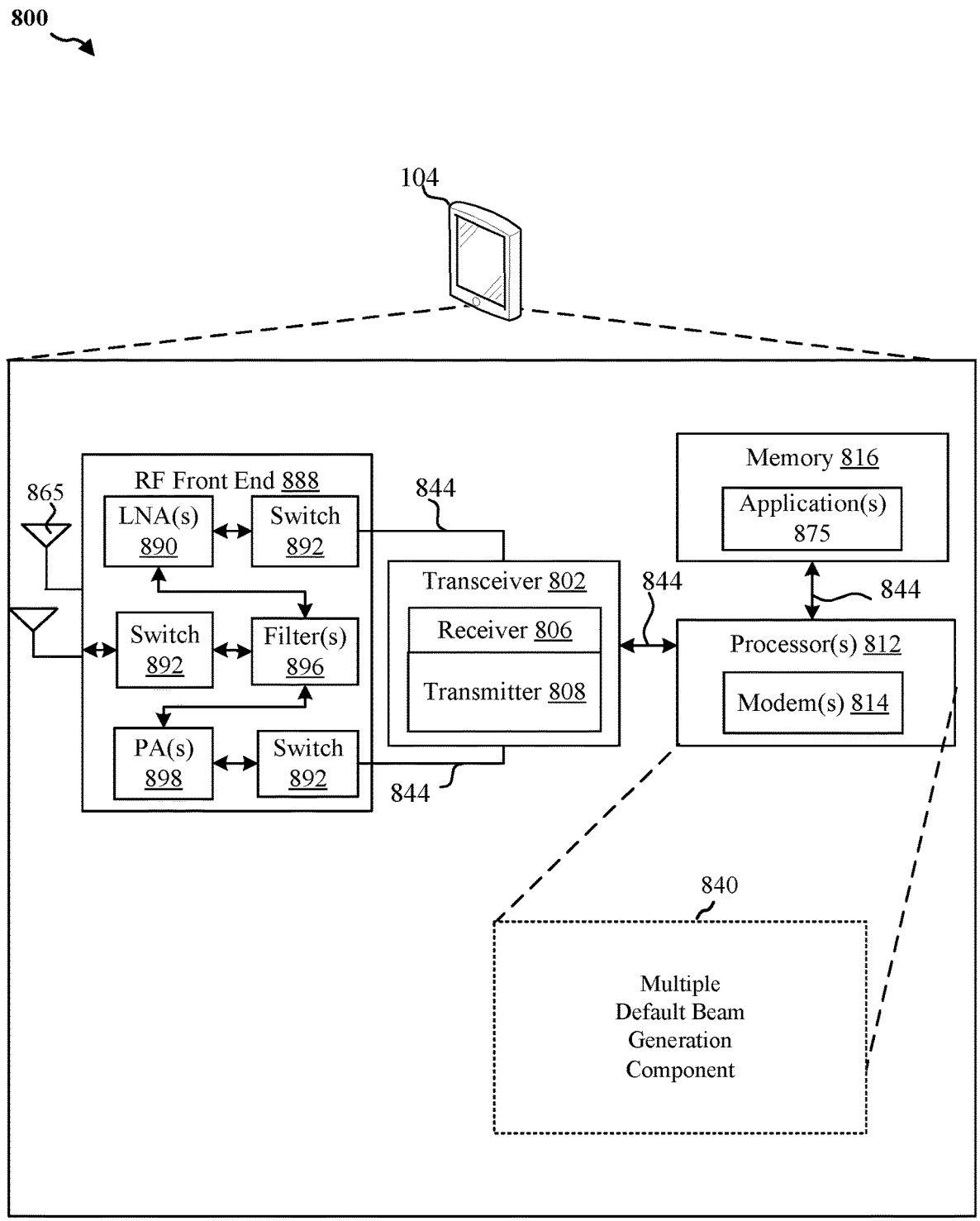
FIG. 8 is a schematic diagram of example components of the UE of FIG. 1.

Referring to FIG. 8, one example of an implementation of UE 104 may include a variety of components, some of which have already been described above, but including components such as one or more processors 812 and memory 816 and transceiver 802 in communication via one or more buses 844, which may operate in conjunction with modem 814 and multiple default beam generation component 840 to enable one or more of the functions described herein related to using multiple default beam configurations. Further, the one or more processors 812, modem 814, memory 816, transceiver 802, RF front end 888 and one or more antennas 865 may be configured to support voice or data calls (simultaneously or non-simultaneously) in one or more radio access technologies.

In an aspect, the one or more processors 812 may include a modem 814 that uses one or more modem processors. The various functions related to multiple default beam generation component 840 may be included in modem 814 or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 or modem 814 associated with multiple default beam generation component 140 may be performed by transceiver 802.

Also, memory 816 may be configured to store data used herein or local versions of applications 875, multiple default beam generation component 840 or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining multiple default beam generation component 840 or one or more of subcomponents thereof, or data associated therewith, when UE 104 is operating at least one processor 812 to execute multiple default beam generation component 840 or one or more subcomponents thereof.

Transceiver 802 may include at least one receiver 806 and at least one transmitter 808. Receiver 806 may include hardware, firmware, or software code executable by a processor for receiving data, the code including instructions and being stored in a memory (such as a computer-readable medium). Receiver 806 may be, for example, a radio frequency (RF) receiver. In an aspect, receiver 806 may receive signals transmitted by at least one UE 104. Additionally, receiver 806 may process such received signals, and also may obtain measurements of the signals, such as, but not limited to, Energy per chip to Interference power ratio (Ec/Io), SNR, reference signal received power (RSRP), received signal strength indicator (RSSI), etc. Transmitter 808 may include hardware, firmware, or software code executable by a processor for transmitting data, the code including instructions and being stored in a memory (such as computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one UE 104 or wireless transmissions transmitted by base station 102. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 or PA 898. In an aspect, RF front end 888 may use one or more switches 892 to select a transmit or receive path using a specified filter 896, LNA 890, or PA 898, based on a configuration as specified by transceiver 802 or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base station 102 or one or more cells associated with one or more base stations 102. In an aspect, for example, modem 814 may configure transceiver 802 to operate at a specified frequency and power level based on the base station configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (such as RF front end 888, transceiver 802) to enable transmission or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection or cell reselection.

Figure 9:
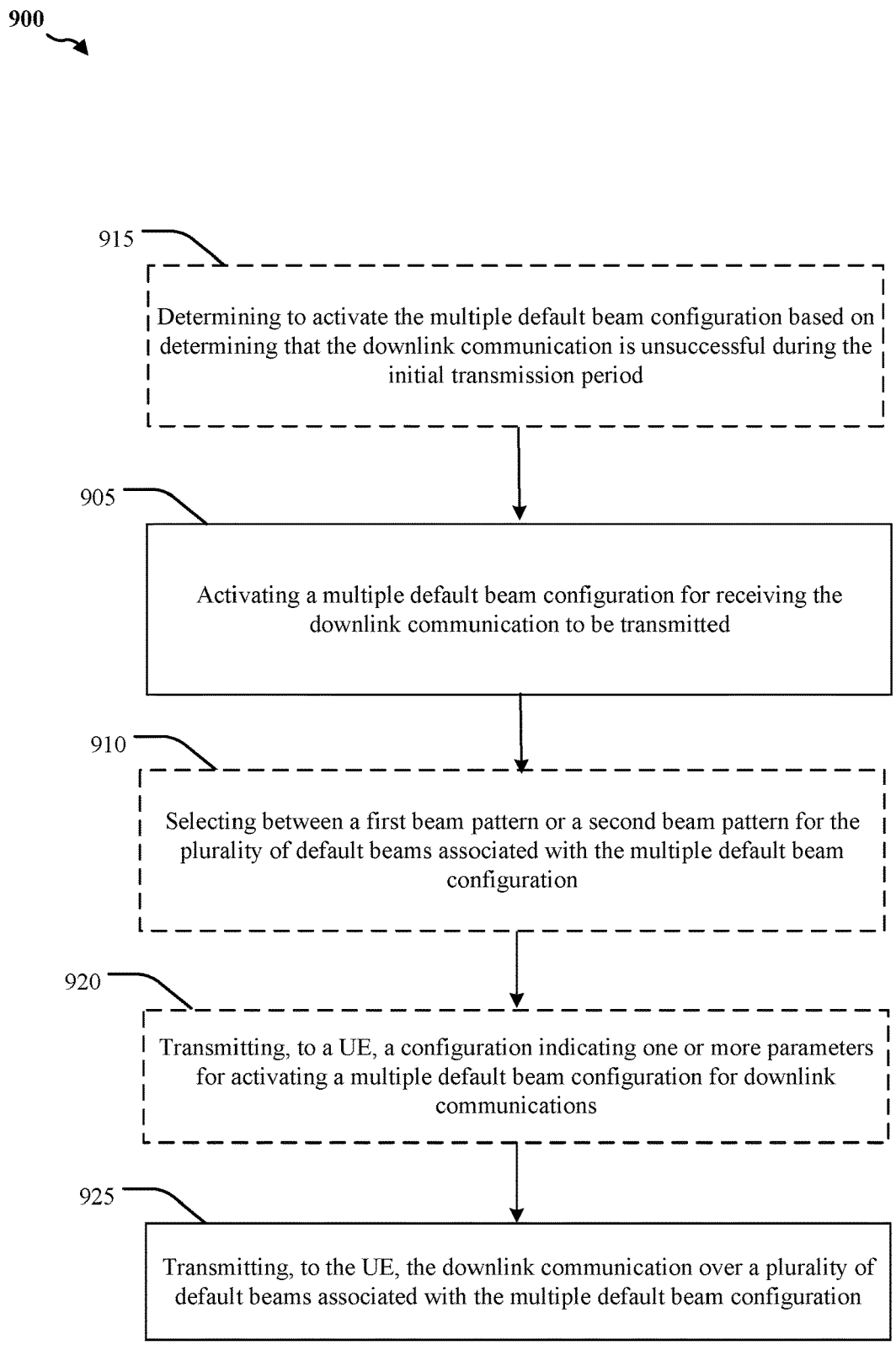
FIG. 9 is a flowchart of an example method of wireless communications performed by the base station.

FIG. 9 is a flowchart of an example of a method 900 of wireless communications. The method 900 may be performed by the base station and/or components thereof.

At block 905, the method 900 may include activating a multiple default beam configuration for receiving the downlink communication to be transmitted. For example, activating the multiple default beam configuration may include the base station determining one of multiple default beams for transmitting downlink communications to the UE and/or otherwise for the UE to receive the downlink communication from the base station. In some examples, the base station can activate the multiple default beam configuration for the downlink communications in the initial transmission period as well as the retransmission period. In other examples, however, the base station may activate the multiple default beam configuration for the downlink communications only in the retransmission period (or only in the initial transmission period), etc. As described, activating the multiple default beam configuration may include determining a transmit beam pattern for transmitting downlink communications within a slot (e.g., determining a first transmit beam for transmitting downlink communications in a first portion of a slot, a second transmit beam for transmitting downlink communications in a second portion of the slot, the first transmit beam (or a third transmit beam) for transmitting in a third portion of the slot, etc.).

In another example, activating the multiple default beam configuration may include the base station determining a transmit beam pattern for each of multiple slots for transmitting downlink communications across the slots (e.g., determining a first transmit beam for transmitting downlink communications in a first slot, a second transmit beam for transmitting downlink communications in a second slot, the first transmit beam (or a third transmit beam) for transmitting in a third slot, etc.). Aspects of block 905 may be performed by the multiple default beam configuration component 1040 discussed with reference to FIG. 10.

At block 910, the method 900 may optionally include selecting between a first beam pattern or a second beam pattern for the plurality of default beams associated with the multiple default beam configuration. In some examples, the first beam pattern may include both a first default beam and a second default beam (and/or additional default beams) included in a first slot (e.g., during the initial transmission period or the retransmission period), and the second beam pattern may include a first default beam in a first slot and a second default beam in a second slot (e.g., during the initial transmission period or the retransmission period), and/or additional default beams in additional subsequent slots, where the pattern may repeat across slots, etc., as described. Aspects of block 910 may be performed by the multiple default beam configuration component 1040 discussed with reference to FIG. 10.

At block 915, the method 900 may optionally include determining to activate the multiple default beam configuration based on determining that the downlink communication is unsuccessful during an initial transmission period. For example, the base station can transmit the downlink communication in an initial transmission period including a first number of slots, and may determine to activate the multiple default beam configuration for at least a portion of a retransmission period including a second number of slots. This determination can be based on feedback received from the UE for the downlink communication in the initial transmission period, which may indicate NACK or otherwise based on determining that feedback is not received from the UE for the downlink communication in the initial transmission period. Aspects of block 915 may be performed by the multiple default beam configuration component 1040 discussed with reference to FIG. 10.

At block 920, the method 900 may optionally include transmitting, to a UE, a configuration indicating one or more parameters for activating a multiple default beam configuration for downlink communications. For example, the base station can transmit an explicit configuration indicating the one or more parameters (e.g., via RRC, MAC CE, DCI, and/or the like) to the UE, or may indicate the configuration implicitly (e.g., based on CORESET beam configuration, where the beam pattern can be determined based on a known association with the CORESET, as described). Aspects of block 920 may be performed by the multiple default beam configuration component 1040 discussed with reference to FIG. 10.

At block 925, the method 900 may include transmitting, to the UE, the downlink communication over a plurality of default beams associated with the multiple default beam configuration. As discussed above, the base station can transmit at least a retransmission of the downlink communication over a retransmission period based on the multiple default beam configuration. In other examples, the base station can additionally or alternatively transmit the initial transmission using the multiple beam configuration in the initial transmission period. For example, the base station can beamform antenna resources to generate the appropriate beam for transmitting the communications to the UE based on the first beam pattern or the second beam pattern. In an example, the retransmission can correspond to PDSCH signaling, as described above. Aspects of block 925 may be performed by the multiple default beam configuration component 1040 discussed with reference to FIG. 10.

Figure 10:
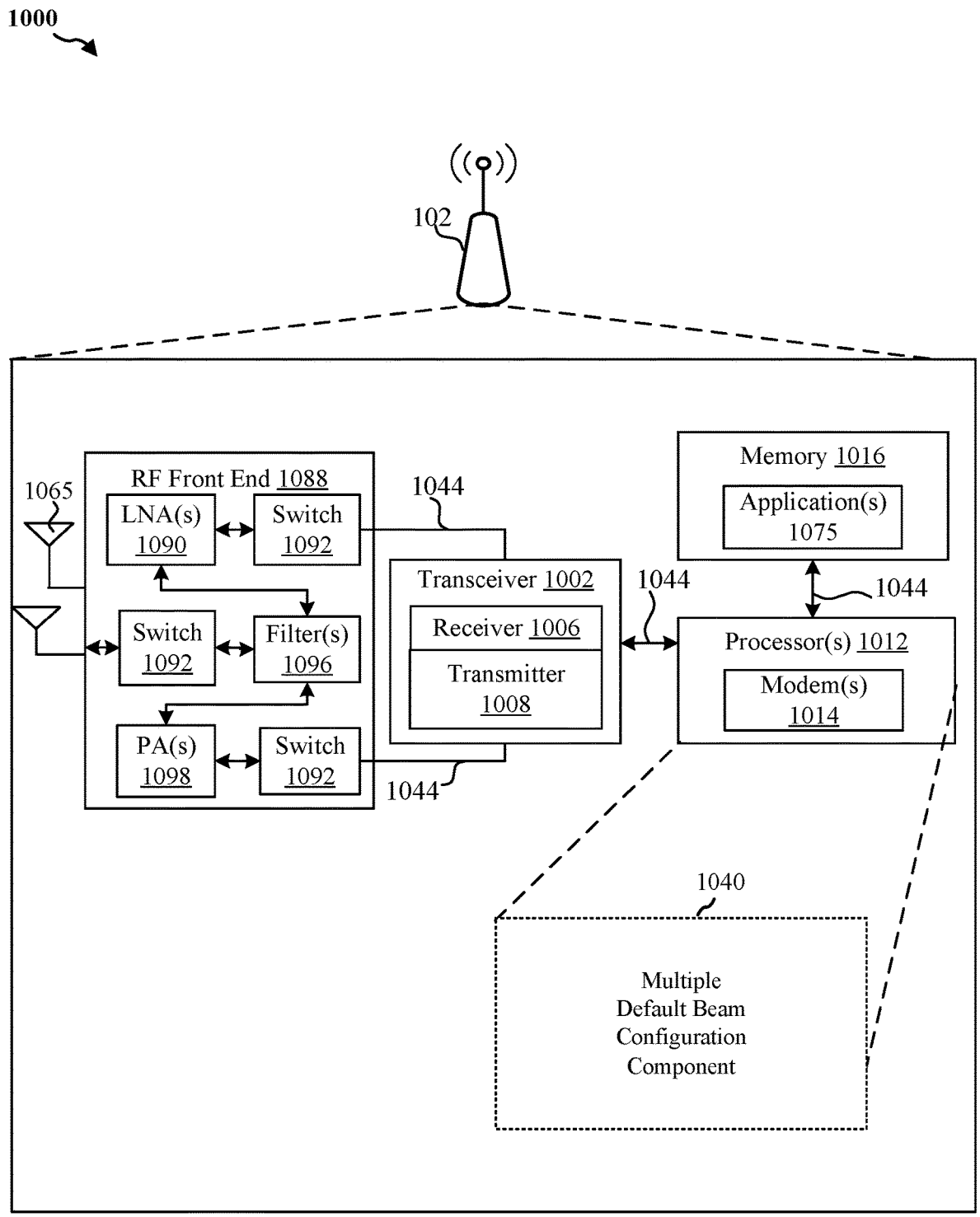
FIG. 10 is a schematic diagram of example components of the base station of FIG. 1.

Referring to FIG. 10, one example of an implementation of base station 102 may include a variety of components, some of which have already been described above, but including components such as one or more processors 1012 and memory 1016 and transceiver 1002 in communication via one or more buses 1044, which may operate in conjunction with modem(s) 1014 and multiple default beam configuration component 1040 related to using multiple default beam configurations.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE IMPLEMENTATIONS

An example method for wireless communication, comprising: determining, at a user equipment (UE), that a downlink communication is unsuccessful during an initial transmission period; activating a multiple default beam configuration for receiving the downlink communication during a retransmission period; and configuring the UE to receive the downlink communication over a plurality of default beams associated with the multiple default beam configuration during the retransmission period.

The above example method, wherein configuring the UE to receive the downlink communication over a plurality of default beams associated with the multiple default beam configuration, comprises: configuring the plurality of default beams within each slot of a plurality of slots available during the retransmission period.

Any of the above example methods, wherein configuring the UE to receive the downlink communication over a plurality of default beams associated with the multiple default beam configuration, comprises: configuring a first default beam of the plurality of default beams for a first slot during the retransmission period to receive the downlink communication; and configuring a second default beam of the plurality of default beams for a second slot during the retransmission period to receive the downlink communication.

Any of the above example methods, further comprising: identifying a subset of available slots during the retransmission period for which to apply multiple default beam configuration; and configuring the UE to receive the downlink communication over the plurality of default beams for the subset of available slots.

Any of the above example methods, wherein determining that the downlink communication is unsuccessful during an initial transmission period, comprises: determining, by the UE, that the downlink communication is either not received or not successfully decoded.

Any of the above example methods, further comprising: generating a negative acknowledgement (NACK) message for transmitting in response to determining that the downlink communication is unsuccessful; and transmitting the NACK to a base station, wherein activating the multiple default beam configuration is based at least in part on transmitting the NACK to the base station.

Any of the above example methods, wherein activating the multiple default beam configuration, comprises: selecting between a first beam pattern or a second beam pattern for the plurality of default beams associated with the multiple default beam configuration, wherein the first beam pattern includes both a first default beam and a second default beam included in a first slot during the retransmission period, and wherein the second beam pattern includes a first default beam in a first slot and a second default beam in a second slot during the retransmission period.

Any of the above example methods, wherein selecting between the first beam pattern or the second beam pattern is determined based on at least one of explicit signaling or implicit rule based on control resource set (CORESET) beam configuration.

Any example UE for wireless communication comprising: a memory storing computer-executable instructions; and at least one processor coupled with the memory and configured to: determine, at a user equipment (UE), that a downlink communication is unsuccessful during an initial transmission period; activate a multiple default beam configuration for receiving the downlink communication during a retransmission period; and configure the UE to receive the downlink communication over a plurality of default beams associated with the multiple default beam configuration during the retransmission period.

The above example UE, wherein configuring the UE to receive the downlink communication over a plurality of default beams associated with the multiple default beam configuration, comprises: configuring the plurality of default beams within each slot of a plurality of slots available during the retransmission period.

Any of the above example UE, wherein configuring the UE to receive the downlink communication over a plurality of default beams associated with the multiple default beam configuration, comprises: configuring a first default beam of the plurality of default beams for a first slot during the retransmission period to receive the downlink communication; and configuring a second default beam of the plurality of default beams for a second slot during the retransmission period to receive the downlink communication.

Any of the above example UE, further comprising: identifying a subset of available slots during the retransmission period for which to apply multiple default beam configuration; and configuring the UE to receive the downlink communication over the plurality of default beams for the subset of available slots.

Any of the above example UE, wherein determining that the downlink communication is unsuccessful during an initial transmission period, comprises: determining, by the UE, that the downlink communication is either not received or not successfully decoded.

Any of the above example UE, further comprising: generating a negative acknowledgement (NACK) message for transmitting in response to determining that the downlink communication is unsuccessful; and transmitting the NACK to a base station, wherein activating the multiple default beam configuration is based at least in part on transmitting the NACK to the base station.

Any of the above example UE, wherein activating the multiple default beam configuration, comprises: selecting between a first beam pattern or a second beam pattern for the plurality of default beams associated with the multiple default beam configuration, wherein the first beam pattern includes both a first default beam and a second default beam included in a first slot during the retransmission period, and wherein the second beam pattern includes a first default beam in a first slot and a second default beam in a second slot during the retransmission period.

Any of the above example UE, wherein selecting between the first beam pattern or the second beam pattern is determined based on at least one of explicit signaling or implicit rule based on control resource set (CORESET) beam configuration.

An example computer readable medium including code executable by one or more processors for wireless communication, the code comprising code for: determining, at a user equipment (UE), that a downlink communication is unsuccessful during an initial transmission period; activating a multiple default beam configuration for receiving the downlink communication during a retransmission period; and configuring the UE to receive the downlink communication over a plurality of default beams associated with the multiple default beam configuration during the retransmission period.

The above example computer readable medium, wherein the code for configuring the UE to receive the downlink communication over a plurality of default beams associated with the multiple default beam configuration, comprises: code for configuring the plurality of default beams within each slot of a plurality of slots available during the retransmission period.

Any of the above example computer readable medium, wherein the code for configuring the UE to receive the downlink communication over a plurality of default beams associated with the multiple default beam configuration, comprises: code for configuring a first default beam of the plurality of default beams for a first slot during the retransmission period to receive the downlink communication; and code for configuring a second default beam of the plurality of default beams for a second slot during the retransmission period to receive the downlink communication.

Any of the above example computer readable medium, further comprising: code for identifying a subset of available slots during the retransmission period for which to apply multiple default beam configuration; and code for configuring the UE to receive the downlink communication over the plurality of default beams for the subset of available slots.

Any of the above example computer readable medium, wherein the code determining that the downlink communication is unsuccessful during an initial transmission period, comprises: code for determining, by the UE, that the downlink communication is either not received or not successfully decoded.

Any of the above example computer readable medium, further comprising: code for generating a negative acknowledgement (NACK) message for transmitting in response to determining that the downlink communication is unsuccessful; and code for transmitting the NACK to a base station, wherein activating the multiple default beam configuration is based at least in part on transmitting the NACK to the base station.

Any of the above example computer readable medium, wherein the code for activating multiple default beam configuration, comprises: code for selecting between a first beam pattern or a second beam pattern for the plurality of default beams associated with the multiple default beam configuration, wherein the first beam pattern includes both a first default beam and a second default beam included in a first slot during the retransmission period, and wherein the second beam pattern includes a first default beam in a first slot and a second default beam in a second slot during the retransmission period.

Any of the above example computer readable medium, wherein the code for selecting selects between the first beam pattern or the second beam pattern determined based on at least one of explicit signaling or implicit rule based on control resource set (CORESET) beam configuration.

An example apparatus for wireless communication, comprising: means for determining, at a user equipment (UE), that a downlink communication is unsuccessful during an initial transmission period; means for activating a multiple default beam configuration for receiving the downlink communication during a retransmission period; and means for configuring the UE to receive the downlink communication over a plurality of default beams associated with the multiple default beam configuration during the retransmission period.

The above example apparatus, wherein means for configuring the UE to receive the downlink communication over a plurality of default beams associated with the multiple default beam configuration, comprises: means for configuring the plurality of default beams within each slot of a plurality of slots available during the retransmission period.

Any of the above example apparatus, wherein means for configuring the UE to receive the downlink communication over a plurality of default beams associated with the multiple default beam configuration, comprises: means for configuring a first default beam of the plurality of default beams for a first slot during the retransmission period to receive the downlink communication; and means for configuring a second default beam of the plurality of default beams for a second slot during the retransmission period to receive the downlink communication.

Any of the above example apparatus, further comprising: means for identifying a subset of available slots during the retransmission period for which to apply multiple default beam configuration; and configuring the UE to receive the downlink communication over the plurality of default beams for the subset of available slots.

Any of the above example apparatus, wherein means for determining that the downlink communication is unsuccessful during an initial transmission period, comprises: means for determining, by the UE, that the downlink communication is either not received or not successfully decoded.

Any of the above example apparatus, further comprising: means for generating a negative acknowledgement (NACK) message for transmitting in response to determining that the downlink communication is unsuccessful; and transmitting the NACK to a base station, wherein activating the multiple default beam configuration is based at least in part on transmitting the NACK to the base station.

Any of the above example apparatus, wherein means for activating the multiple default beam configuration, comprises: selecting between a first beam pattern or a second beam pattern for the plurality of default beams associated with the multiple default beam configuration, wherein the first beam pattern includes both a first default beam and a second default beam included in a first slot during the retransmission period, and wherein the second beam pattern includes a first default beam in a first slot and a second default beam in a second slot during the retransmission period.

Any of the above example apparatus, wherein means for selecting selects between the first beam pattern or the second beam pattern determined based on at least one of explicit signaling or implicit rule based on control resource set (CORESET) beam configuration.

An example method of wireless communication including activating, by a user equipment (UE), a multiple default beam configuration for receiving a downlink communication, and configuring, by the UE, a plurality of default beams over which to receive, in a period comprising a plurality of slots, the downlink communication, wherein the plurality of default beams are associated with the multiple default beam configuration.

Any of the above example method wherein the period corresponds to a retransmission period of a collection of slots that include an initial transmission period and the retransmission period.

The above example method wherein activating the multiple default beam configuration is for the retransmission period based on determining that the downlink communication is unsuccessful during the initial transmission period.

Any of the above example method wherein determining that the downlink communication is unsuccessful during an initial transmission period, comprises determining, by the UE, that the downlink communication is either not received or not successfully decoded.

Any of the above example method further comprising generating a negative acknowledgement (NACK) message for transmitting in response to determining that the downlink communication is unsuccessful, and transmitting the NACK to a base station, wherein activating the multiple default beam configuration is based at least in part on transmitting the NACK to the base station.

Any of the above example method wherein configuring the plurality of default beams associated with the multiple default beam configuration, comprises configuring the plurality of default beams within each slot of the plurality of slots.

Any of the above example method wherein configuring the plurality of default beams associated with the multiple default beam configuration, comprises configuring a first default beam of the plurality of default beams for a first slot of the plurality of slots to receive the downlink communication, and configuring a second default beam of the plurality of default beams for a second slot of the plurality of slots to receive the downlink communication.

Any of the above example method further comprising identifying a subset of available slots in the period for which to apply multiple default beam configuration, and configuring the plurality of default beams for the subset of available slots to receive the downlink communication.

Any of the above example method wherein activating the multiple default beam configuration, comprises selecting between a first beam pattern or a second beam pattern for the plurality of default beams associated with the multiple default beam configuration, wherein the first beam pattern includes both a first default beam and a second default beam included in a first slot of the plurality of slots, and wherein the second beam pattern includes a first default beam in a first slot and a second default beam in a second slot of the plurality of slots.

Any of the above example method wherein selecting between the first beam pattern or the second beam pattern is determined based on at least one of explicit signaling or implicit rule based on control resource set (CORESET) beam configuration.

An example user equipment (UE) for wireless communication include a memory storing computer-executable instructions, and at least one processor coupled with the memory and configured to activate a multiple default beam configuration for receiving a downlink communication during a retransmission period, and configure a plurality of default beams over which to receive, in a period comprising a plurality of slots, the downlink communication, wherein the plurality of default beams are associated with the multiple default beam configuration during the retransmission period.

Any of the above example UE wherein the period corresponds to a retransmission period of a collection of slots that include an initial transmission period and the retransmission period.

The above example UE wherein the at least one processor is configured to activate the multiple default beam configuration for the retransmission period based on determining that the downlink communication is unsuccessful during the initial transmission period.

Any of the above example UE wherein the at least one processor is configured to determine that the downlink communication is unsuccessful during an initial transmission period, at least in part by determining, by the UE, that the downlink communication is either not received or not successfully decoded.

Any of the above example UE wherein the at least one processor is further configured to generate a negative acknowledgement (NACK) message for transmitting in response to determining that the downlink communication is unsuccessful, and transmit the NACK to a base station, wherein activating the multiple default beam configuration is based at least in part on transmitting the NACK to the base station.

Any of the above example UE wherein the at least one processor is configured to configure the plurality of default beams associated with the multiple default beam configuration at least in part by configuring the plurality of default beams within each slot of the plurality of slots.

Any of the above example UE wherein the at least one processor is configured to configure the plurality of default beams associated with the multiple default beam configuration, at least in part by configuring a first default beam of the plurality of default beams for a first slot of the plurality of slots period to receive the downlink communication, and configuring a second default beam of the plurality of default beams for a second slot of the plurality of slots to receive the downlink communication.

Any of the above example UE wherein the at least one processor is further configured to identify a subset of available slots in the period for which to apply multiple default beam configuration, and configure the plurality of default beams for the subset of available slots to receive the downlink communication.

Any of the above example UE wherein the at least one processor is configured to activate the multiple default beam configuration, at least in part by selecting between a first beam pattern or a second beam pattern for the plurality of default beams associated with the multiple default beam configuration, wherein the first beam pattern includes both a first default beam and a second default beam included in a first slot of the plurality of slots, and wherein the second beam pattern includes a first default beam in a first slot and a second default beam in a second slot of the plurality of slots.

Any of the above example UE wherein the at least one processor is configured to select between the first beam pattern or the second beam pattern based on at least one of explicit signaling or implicit rule based on control resource set (CORESET) beam configuration.

An example method of wireless communication includes activating, by a base station, a multiple default beam configuration for a UE to receive a downlink communication transmitted by the base station, and transmitting, by a base station and in a period comprising a plurality of slots, the downlink communication over a plurality of default beams associated with the multiple default beam configuration.

The above example method wherein the period corresponds to a retransmission period of a collection of slots that include an initial transmission period and the retransmission period.

Any of the above example method wherein activating the multiple default beam configuration is for the retransmission period based on determining that the downlink communication is unsuccessful during the initial transmission period.

Any of the above example method further comprising transmitting, by the base station and to a user equipment (UE), a configuration indicating one or more parameters for activating the multiple default beam configuration.

Any of the above example method wherein the one or more parameters indicate resources for receiving the plurality of default beams within each slot of the plurality of slots.

Any of the above example method wherein the one or more parameters indicate resources for receiving a first default beam of the plurality of default beams for a first slot of the plurality of slots to receive the downlink communication and a second default beam of the plurality of default beams for a second slot of the plurality of slots to receive the downlink communication.

Any of the above example method wherein transmitting the configuration includes transmitting the configuration to the UE in radio resource control (RRC) signaling or a media access control (MAC) control element (CE).

Any of the above example method wherein indicating the one or more parameters comprises indicating a first beam pattern or a second beam pattern for the plurality of default beams associated with the multiple default beam configuration, wherein the first beam pattern includes both a first default beam and a second default beam included in a first slot of the plurality of slots, and wherein the second beam pattern includes a first default beam in a first slot and a second default beam in a second slot of the plurality of slots.

An example base station for wireless communication, comprising a memory storing computer-executable instructions, and at least one processor coupled with the memory and configured to activate a multiple default beam configuration for a UE to receive a downlink communication transmitted by the apparatus, and transmit, in a period comprising a plurality of slots, the downlink communication over a plurality of default beams associated with the multiple default beam configuration.

The above example base station wherein the period corresponds to a retransmission period of a collection of slots that include an initial transmission period and the retransmission period.

What is claimed is:

1. A method of wireless communication, comprising:
activating, by a user equipment (UE), a multiple default beam configuration including a plurality of default beams to use for receiving one or more retransmissions of a downlink communication in each of a plurality of slots, wherein the plurality of default beams are selected from a first beam pattern of multiple default receive beams or a second beam pattern of multiple default receive beams, wherein the plurality of slots are in a retransmission period, wherein activating the multiple default beam configuration is based on the downlink communication being unsuccessful when using an initial default beam during an initial transmission period; and
configuring, by the UE and based on activating the multiple default beam configuration, the plurality of default beams over which to receive, in one or more of the plurality of slots, the one or more retransmissions of the downlink communication.

2. The method of claim 1, wherein receiving of the downlink communication is unsuccessful during the initial transmission period based on the downlink communication being either not received or not successfully decoded.

3. The method of claim 2, further comprising:
generating a negative acknowledgement (NACK) message for transmitting in response to receiving of the downlink communication being unsuccessful; and
transmitting the NACK to a base station, wherein activating the multiple default beam configuration is based at least in part on transmitting the NACK to the base station.

4. The method of claim 1, wherein configuring the plurality of default beams associated with the multiple default beam configuration, comprises:
configuring the plurality of default beams within each slot of the plurality of slots.

5. The method of claim 1, wherein configuring the plurality of default beams associated with the multiple default beam configuration, comprises:
configuring a first default beam of the plurality of default beams for a first slot of the plurality of slots to receive a first retransmission of the downlink communication; and
configuring a second default beam of the plurality of default beams for a second slot of the plurality of slots to receive a second retransmission of the downlink communication.

6. The method of claim 1, further comprising:
identifying the plurality of slots in the retransmission period for which to apply multiple default beam configuration; and configuring the plurality of default beams for the plurality of slots to receive the downlink communication.

7. The method of claim 1,
wherein the first beam pattern includes both a first default beam and a second default beam included in a first slot of the plurality of slots, and
wherein the second beam pattern includes a first default beam in a first slot and a second default beam in a second slot of the plurality of slots.

8. The method of claim 7, wherein selecting between the first beam pattern or the second beam pattern is determined based on at least one of explicit signaling or implicit rule based on control resource set (CORESET) beam configuration.

9. A user equipment (UE) for wireless communication, comprising:
a memory storing computer-executable instructions; and
at least one processor coupled with the memory and configured to:
activate a multiple default beam configuration including a plurality of default beams to use for receiving one or more retransmissions of a downlink communication in each of a plurality of slots, wherein the plurality of default beams are selected from a first beam pattern of multiple default receive beams or a second beam pattern of multiple default receive beams, wherein the plurality of slots are in a retransmission period, wherein the at least one processor is configured to activate the multiple default beam configuration based on the downlink communication being unsuccessful when using an initial default beam during an initial transmission period; and
configure, based on activating the multiple default beam configuration, the plurality of default beams over which to receive, in one or more of the plurality of slots, the one or more retransmissions of the downlink communication.

10. The UE of claim 9, wherein receiving the downlink communication is unsuccessful during the initial transmission period based on the downlink communication being either not received or not successfully decoded.

11. The UE of claim 10, wherein the at least one processor is further configured to:
generate a negative acknowledgement (NACK) message for transmitting in response to receiving of the downlink communication being unsuccessful; and
transmit the NACK to a base station, wherein activating the multiple default beam configuration is based at least in part on transmitting the NACK to the base station.

12. The UE of claim 9, wherein the at least one processor is configured to configure the plurality of default beams associated with the multiple default beam configuration at least in part by:
configuring the plurality of default beams within each slot of the plurality of slots.

13. The UE of claim 9, wherein the at least one processor is configured to configure the plurality of default beams associated with the multiple default beam configuration, at least in part by:
configuring a first default beam of the plurality of default beams for a first slot of the plurality of slots to receive a first retransmission of the downlink communication; and
configuring a second default beam of the plurality of default beams for a second slot of the plurality of slots to receive a second retransmission of the downlink communication.

14. The UE of claim 9, wherein the at least one processor is further configured to:
identify the plurality of slots in the retransmission period for which to apply multiple default beam configuration; and
configure the plurality of default beams for the plurality of slots to receive the downlink communication.

15. The UE of claim 9,
wherein the first beam pattern includes both a first default beam and a second default beam included in a first slot of the plurality of slots, and
wherein the second beam pattern includes a first default beam in a first slot and a second default beam in a second slot of the plurality of slots.

16. The UE of claim 15, wherein the at least one processor is configured to select between the first beam pattern or the second beam pattern based on at least one of explicit signaling or implicit rule based on control resource set (CORESET) beam configuration.

17. A method of wireless communication, comprising:
activating, by a base station, a multiple default beam configuration including a plurality of default beams for a user equipment (UE) to use to receive one or more retransmissions of a downlink communication transmitted by the base station in each of a plurality of slots, wherein the plurality of default beams are selected from a first beam pattern of multiple default receive beams or a second beam pattern of multiple default receive beams, wherein the plurality of slots are in a retransmission period, wherein activating the multiple default beam configuration is based on the downlink communication being unsuccessful when using an initial default beam at the UE during an initial transmission period; and
transmitting, by a base station and based on activating the multiple default beam configuration, the one or more retransmissions of the downlink communication using the plurality of default beams in each of the plurality of slots.

18. The method of claim 17, further comprising transmitting, by the base station and to the UE, a configuration indicating one or more parameters for activating the multiple default beam configuration.

19. The method of claim 18, wherein the one or more parameters indicate resources for receiving the plurality of default beams within each slot of the plurality of slots.

20. The method of claim 18, wherein the one or more parameters indicate resources for receiving a first default beam of the plurality of default beams for a first slot of the plurality of slots to receive a first retransmission of the downlink communication and a second default beam of the plurality of default beams for a second slot of the plurality of slots to receive a second retransmission of the downlink communication.

21. The method of claim 18, wherein transmitting the configuration includes transmitting the configuration to the UE in radio resource control (RRC) signaling or a media access control (MAC) control element (CE).

22. The method of claim 18, wherein the configuration indicates the one or more parameters as the first beam pattern or the second beam pattern,
wherein the first beam pattern includes both a first default beam and a second default beam included in a first slot of the plurality of slots, and
wherein the second beam pattern includes a first default beam in a first slot and a second default beam in a second slot of the plurality of slots.

23. A base station for wireless communication, comprising:
- a memory storing computer-executable instructions; and
- at least one processor coupled with the memory and configured to:
  - activate a multiple default beam configuration including a plurality of default beams for a user equipment (UE) to use to receive one or more retransmissions of a downlink communication transmitted by the base station in each of a plurality of slots, wherein the plurality of default beams are selected from a first beam pattern of multiple default receive beams or a second beam pattern of multiple default receive beams, wherein the plurality of slots are in a retransmission period, wherein the at least one processor is configured to activate the multiple default beam configuration based on the downlink communication being unsuccessful when using an initial default beam at the UE during an initial transmission period; and
  - transmit, based on activating the multiple default beam configuration, the one or more retransmissions of the downlink communication using the plurality of default beams in each of the plurality of slots.

24. The base station of claim 23, wherein the at least one processor is further configured to transmit, to the UE, a configuration indicating one or more parameters for activating the multiple default beam configuration.

25. The base station of claim 24, wherein the one or more parameters indicate resources for receiving the plurality of default beams within each slot of the plurality of slots.

26. The base station of claim 24, wherein the one or more parameters indicate resources for receiving a first default beam of the plurality of default beams for a first slot of the plurality of slots to receive a first retransmission of the downlink communication and a second default beam of the plurality of default beams for a second slot of the plurality of slots to receive a second retransmission of the downlink communication.

27. The base station of claim 24, wherein the at least one processor is configured to transmit the configuration to the UE in radio resource control (RRC) signaling or a media access control (MAC) control element (CE).

28. The base station of claim 24, wherein the configuration indicates the one or more parameters as the first beam pattern or the second beam pattern for the plurality of default beams associated with the multiple default beam configuration,
  - wherein the first beam pattern includes both a first default beam and a second default beam included in a first slot of the plurality of slots, and
  - wherein the second beam pattern includes a first default beam in a first slot and a second default beam in a second slot of the plurality of slots.

* * * * *